Figure 2:
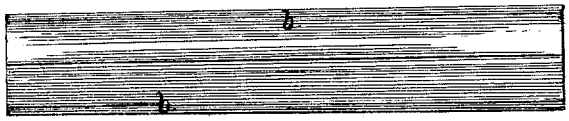
Figure 1:
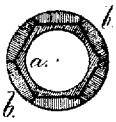

EPHRAIM S. JOHNSON.

Improvement in Ornamenting Pencil Cases.

No. 5,134. Reissued Nov. 5, 1872,

Witnesses,

Chas H Smith

Geo T Pinckney

E. S. Johnson

Lemuel W. Serrell atty

AM. PHOTO-LITHOGRAPHIC CO. N.Y. (OSBORNE'S PROCESS.)

UNITED STATES PATENT OFFICE.

EPHRAIM S. JOHNSON, OF JERSEY CITY, NEW JERSEY.

IMPROVEMENT IN ORNAMENTED PENCIL-CASES.

Specification forming part of Letters Patent No. 121,627, dated December 5, 1871; reissue No. 5,134, dated November 5, 1872.

*To all whom it may concern:*

Be it known that I, EPHRAIM S. JOHNSON, of Jersey City, in the county of Hudson and State of New Jersey, have invented new and useful Improvements in Ornamented Pencil-Cases; and I do hereby declare that the following is a full, clear, and exact description thereof, reference being had to the accompanying drawing and to the letters of reference marked thereon making a part of this specification.

My invention has for its object an improvement in pencil-cases, so as to make them highly ornamental as well as useful and durable. The nature of my invention consists in a pencil or pen case made in the form of a tube, of any of the well-known metals suitable for the purpose, with a polygonal surface, upon which I place and secure slabs of the mother-of-pearl. These slabs of pearl are rigidly secured to the metal cylinder or tube by any good cement. Efforts have been made to apply slabs of mother-of-pearl to various articles; but where a slab is filed out to fit a round pencil-case, or similar article, considerable time is necessary, and difficulty is experienced in fitting the joints, besides which the slabs are liable to become loose in finishing off the surface; whereas, when the slabs are fitted to a flat or polygonal surface the flat surface and the edges of the slab may be fitted with facility and the greatest accuracy; and the increased thickness at the center will render the slab much stronger than if fitted to a cylindrical surface.

Pencil-cases, knife-handles, and other articles have been made of pearl; but dealers and workers in this material know that pearl has its bright side and also its dark side, and hence where solid pieces are employed the appearance of one side is very inferior. By my invention a new and very superior article of manufacture is produced, because the full beauty of the pearl is brought out whenever it is laid upon the case so as to extend entirely around, and can be finished or polished with but little expense, and the slabs or strips are not liable to become loosened while undergoing this operation.

To enable others skilled in the art to make and use my invention, I will proceed to describe its construction.

Figure I is a transverse vertical sectional elevation, showing the ends of the pearl and the shape in which they are made when secured to the tube apart. Fig. II is a side elevation of my invention.

Letters of like name and kind indicate like parts in each of the figures.

*a* represents a cylinder or tube made of any of the well-known metals, of any suitable dimensions that may be desired, upon which the slabs of pearl *b* are attached, said tube *a* having prismatic form, being in section polygonal, of six sides or any other number of sides desired; and upon each of the sides a slab of pearl is applied, and caused to adhere thereto by means of shellac or other suitable material. The surface of the pearl, or all the materials that form the outer surface of the body of the pencil, is then finished in any well-known manner, and presents the bright side of the pearl and the beautiful appearance consequent thereon to the eye.

Having thus described my invention, what I claim as new, and desire to secure by Letters Patent of the United States, is—

A pencil or pen case, made of a metal tube, with flat surfaces to receive the ornamental covering-slabs, as and for the purpose set forth.

EPHRAIM S. JOHNSON.

Witnesses:
FRANK ROGERS,
AUGUSTUS NOE.